(12) United States Patent
Apodaca et al.

(10) Patent No.: US 8,517,622 B2
(45) Date of Patent: Aug. 27, 2013

(54) CLEAR COSMETIC TIP WITH OPAQUE CORE

(75) Inventors: Adrian C. Apodaca, Santa Monica, CA (US); Timothy Thorpe, Santa Monica, CA (US)

(73) Assignee: HCT Asia Ltd, Central (HK)

( * ) Notice: Subject to any disclaimer, the term of this patent is extended or adjusted under 35 U.S.C. 154(b) by 694 days.

(21) Appl. No.: 12/698,967

(22) Filed: Feb. 2, 2010

(65) Prior Publication Data
US 2011/0188920 A1     Aug. 4, 2011

(51) Int. Cl.
*B43M 11/06*     (2006.01)
(52) U.S. Cl.
USPC ........... 401/262; 401/183; 401/184; 401/185; 401/261; 401/265
(58) Field of Classification Search
USPC ............... 401/145, 183, 184, 185, 186, 194, 401/261, 265
See application file for complete search history.

(56) References Cited

U.S. PATENT DOCUMENTS

| | | | | |
|---|---|---|---|---|
| 6,102,602 A | * | 8/2000 | Kageyama et al. | 401/269 |
| 6,129,469 A | * | 10/2000 | Messer et al. | 401/6 |
| 6,287,034 B1 | * | 9/2001 | Miraglia et al. | 401/122 |
| 6,607,323 B2 | * | 8/2003 | Breidenbach et al. | 401/6 |
| 7,040,830 B2 | * | 5/2006 | Kliegman et al. | 401/290 |
| 2001/0047949 A1 | * | 12/2001 | Bono | 206/438 |
| 2006/0093426 A1 | * | 5/2006 | Tsaur | 401/184 |
| 2006/0198686 A1 | * | 9/2006 | Hetzel | 401/47 |
| 2006/0207627 A1 | * | 9/2006 | Thorpe et al. | 132/320 |
| 2008/0060668 A1 | * | 3/2008 | Legassie | 132/218 |
| 2008/0193193 A1 | * | 8/2008 | Pechko et al. | 401/81 |

* cited by examiner

*Primary Examiner* — David Walczak
*Assistant Examiner* — Joshua Wiljanen
(74) *Attorney, Agent, or Firm* — Lee & Hayes, PLLC (57) ABSTRACT

A dispenser includes a multi-layered tip and a housing having a reservoir for containing a product, such as a cosmetic product or a medicinal product. The multi-layered tip comprises a translucent outer tip molded about an opaque inner tip. Both the translucent outer tip and the opaque inner tip may be formed of materials that are suitable for an injection overmold manufacturing process.

24 Claims, 9 Drawing Sheets

CLEAR COSMETIC TIP WITH OPAQUE CORE

BACKGROUND

Devices exist for dispensing cosmetic or medicinal products. Such devices usually consist of an outer tubular shell or housing, a delivery mechanism for displacement of the cosmetic or medicinal products, and an applicator tip. For example, in the medical industry, applicators are employed for applying medicinal products, such as ointments, to portions of the body. In the cosmetics and personal care industries, applicators are used to apply lipstick, lip balm, skin creams, lotions, and other cosmetic products to portions of the body.

SUMMARY

This summary is provided to introduce simplified concepts of dispensers with multi-layered applicator tips, which are further described below in the Detailed Description. This summary is not intended to identify essential features of the claimed subject matter, nor is it intended for use in determining the scope of the claimed subject matter.

This disclosure is directed to dispensers with multi-layered applicator tips having an opaque inner tip and a translucent outer tip. The opaque inner tip may be the same color as the color of a product contained in the dispenser with the multi-layered tip disposed thereon. The multi-layered tips may allow a product to be applied locally or topically to a selected area of a surface.

In one implementation, the multi-layered tip is coupled to a housing having a flexible wall for dispensing product and may have a reservoir for product storage. In another implementation, the multi-layered tip is coupled to a housing having a reservoir with two flexible walls for dispensing product. Additionally, the multi-layered tip may have an application face for applying the product to the user's skin.

In some implementations, the multi-layered tip may be manufactured via an injection over-molding process. Other manufacturing techniques are contemplated, for example, separately molding the inner body and the outer body and subsequently assembling the opaque inner tip and translucent outer tip and thereby producing the multi-layered tip. The opaque inner tip may comprise a plastic, a glass, a metal or any other suitable material. Likewise the translucent outer tip may comprise a plastic, a glass or any other suitable material. As used herein, translucent materials are those that allow passage of light, and include materials that are transparent, clear, colorless, and tinted, as long as they allow passage of a substantial amount of light so that the inner tip is visible through the material of the outer tip.

In still further implementations, multi-layered tips may include a product delivery duct. The product delivery duct may interconnect the reservoir contained in the housing and may extend through the opaque inner tip to an orifice disposed in the translucent outer tip for dispensing product to the application face.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to dispensers with multi-layer tips that are disposed on housings with a flexible wall. The multi-layer tip has an application face disposed therein. The application face is able to apply product to a surface. In particular, the multi-layer tip may have an opaque inner tip comprising various plastics, metals, ceramics, or composites, and a translucent outer tip also comprising various plastics, ceramics, or composites. For example, the opaque inner tip and translucent outer tip may be formed of plastics and may be made using an injection over-molding process. Additionally, product may be dispensed from the dispenser through a product delivery duct disposed in the multi-layered tip for application of the product to a user's skin. In some implementations, the opaque inner tip may be of a same color as the product housed in the dispenser. By virtue of the layered translucent outer tip and opaque inner tip, a color of the product contained in the reservoir may be observed before application. Moreover, the application face of the multi-layer tip may comprise a substantially more supple material and/or a substantially smoother material than the inner tip, thereby providing a more comfortable application of the product.

Illustrative Dispenser with Multi-Layered Tip

Figure 1:
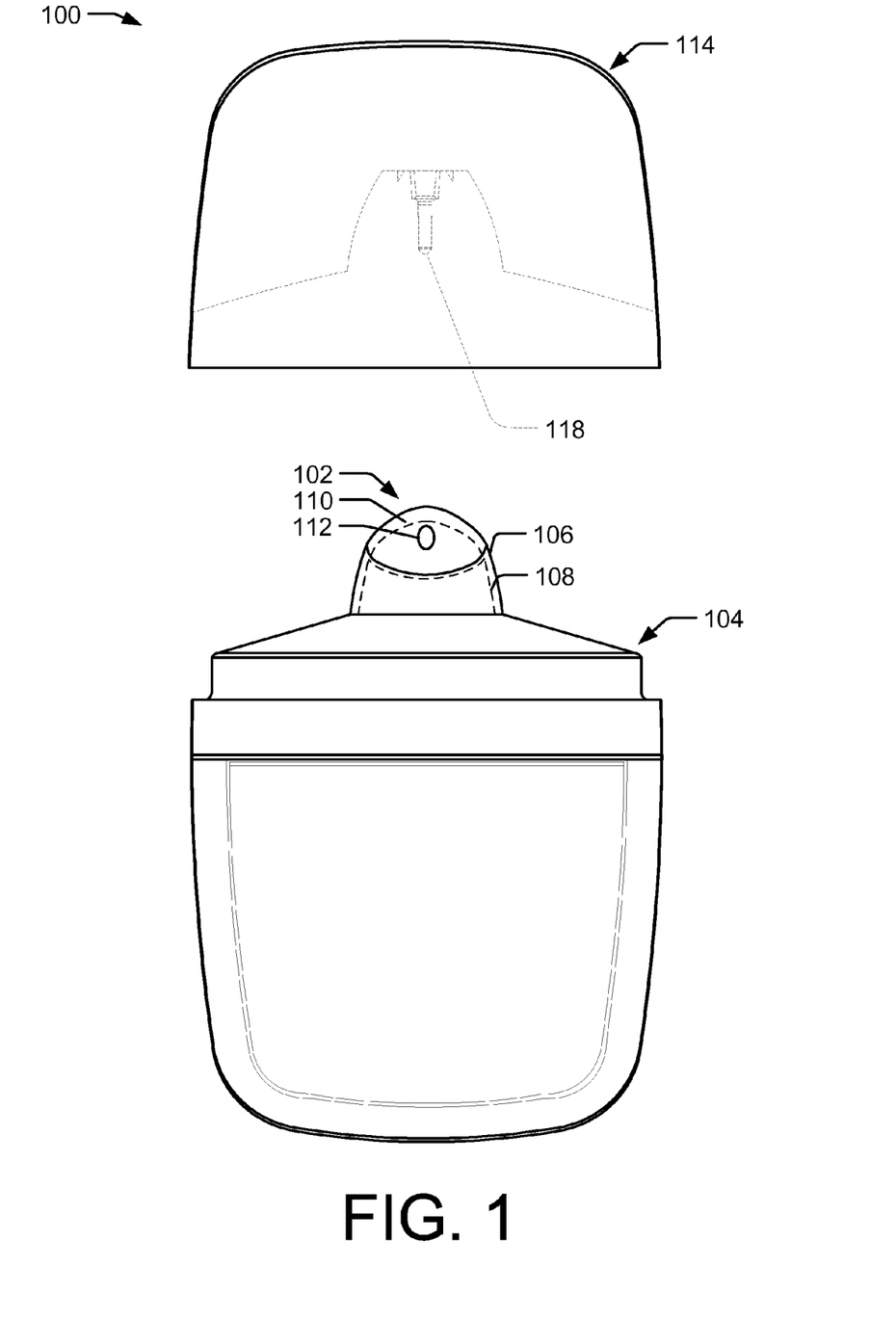
FIG. 1 represents an illustrative dispenser comprising a cap and a multi-layered tip coupled to a housing.

FIG. 1 represents an illustrative dispenser 100 with a multi-layered tip 102 and a housing 104. Multi-layered tip 102 comprises a translucent outer tip 106 molded about an opaque inner tip 108. In some embodiments, translucent outer tip 106 may comprise acrylic, thermoplastic polyesters (e.g., polycyclohexlandymethanol terephthalate—PCT, PCTA, PCTG), Polymethyl methacrylate (PMMA), clarified acrylonitrile butadiene styrene (ABS), or other translucent materials. In some embodiments, the opaque inner tip 108 may comprise PCT, PCTA, PCTG, PMMA, polypropylene (PP), ABS, or other opaque materials. In the embodiment of FIG. 1, the multi-layer tip 102 comprises generally a conical body having a concave surface formed therein. In this embodiment, the concave surface formed in the conical body of multi-layered tip defines an application face 110. Here, translucent outer tip 106 is illustrated as having application face 110 disposed therein, in which, product delivery duct 112 is shown to be terminating. Product delivery duct 112 may provide interconnection of application face 110 to a reservoir of housing 104. In this example, the housing 104 is substantially pouch-shaped. The housing 104 may comprise a flexible wall or may comprise two flexible walls for forcing product to the application face 110. Housing 104 may be comprised of plastic, metal, ceramic or any other suitable material. For example, housing 104 may be comprised of terpolymer (e.g., DuPont™ Surlyn®), polypropylene (PP), acrylonitrile butadiene styrene (ABS) or Polyoxymethylene (POM).

The dispenser 100 also includes a cap 114 that encapsulates the multi-layered tip 102 when the dispenser is not in use and includes a plug 118 that seals the product delivery duct 112. The plug 118 may be made of a thermoplastic polymer or any other material which is non-reactive or resistant to the product being dispensed, such as various metals, plastics, ceramics, composites, or the like.

Figure 2:
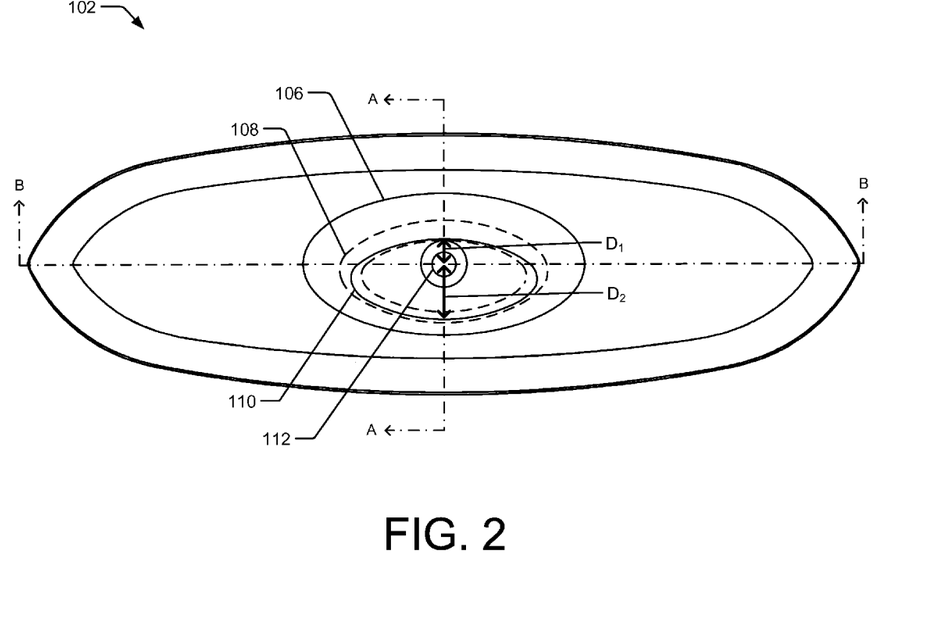
FIG. 2 illustrates a top view of the multi-layered tip of the dispenser shown in FIG. 1 in more detail.

FIG. 2 is a top view of the multi-layered tip 102 of dispenser 100 in more detail. Again, the multi-layered tip 102 generally comprises a translucent outer tip 106 molded about an opaque inner tip 108. The translucent outer tip 106 includes the application face 110 and the product delivery duct 112, which forms a dispensing path for dispensing the product from the housing 104. In one implementation, the product delivery duct 112 is positioned slightly off center within application face 110. This is illustrated by the dimension lines $_{D1}$ and $_{D2}$ in FIG. 2, where $_{D1}$ is the distance from the topmost point of application face 110 to the center of the product delivery duct 112, and $_{D2}$ is the distance from the bottommost point of application face 110 to the center of the product delivery duct 112. As shown in the FIG. 2, $_{D2}$ is greater than $_{D1}$.

In this implementation the multi-layered tip 102 is shown as being a generally conical body having a concave surface. Furthermore, and in this implementation, the multi-layered tip 102 comprises a translucent outer tip 106, formed of acrylic, molded about an opaque inner tip 108 formed of polypropylene, ABS, or any other translucent material. However, in other implementations, the multi-layered tip 102 may be configured in any form suitable for the application of the product contained in dispenser 100 and be made of any suitable material or combination of materials. For example, the multi-layered tip 102 may be a generally tongue like body having a convex surface longitudinal to the housing. Likewise, generally tongue like multi-layered tip may comprise a translucent outer tip, formed of acrylic, molded about an opaque inner tip formed of polypropylene, ABS, or any other opaque material.

Figure 3:
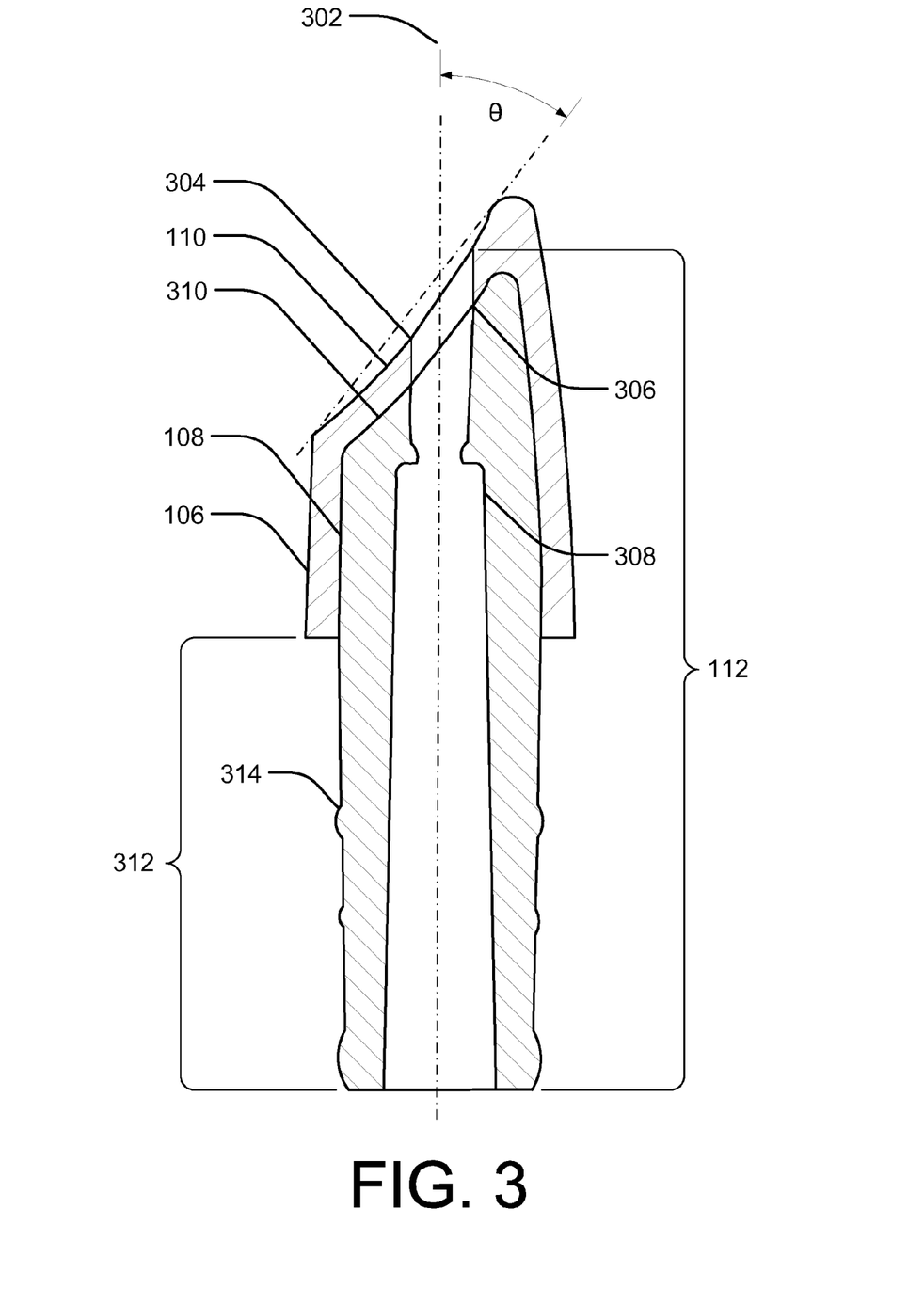
FIG. 3 illustrates cross-section A-A of the multi-layered tip of the dispenser shown in FIG. 1, taken along line A-A of FIG. 2.

FIG. 3 illustrates a cross-section of multi-layered tip 102 taken along A-A shown in FIG. 2. Specifically, FIG. 3 illustrates an angle θ of the application face 110 with respect to a centerline 302 of the multi-layered tip 102. In the illustrated implementation, the angle θ is about 45 degrees. This design facilitates application of the product to the user's skin. However, other designs may be used. For example, in other implementations the angle θ may be between about 30° and about 75°. Still further implementations may have angles anywhere from 0° to 90°.

FIG. 3 further illustrates the construction of multi-layered tip 102. As discussed above, the multi-layered tip 102 includes a translucent outer tip 106, formed of acrylic, capable of being molded about an opaque inner tip 108. Opaque inner tip 108 in this example may be formed of polypropylene (PP) or acrylonitrile butadiene styrene (ABS) and is capable of maintaining its shape during an injection over-molding manufacturing process. Specifically, opaque inner tip 108 is capable of maintaining its shape when translucent outer tip 106 is injection over-molded about opaque inner tip 108. As illustrated in FIG. 3, a product delivery duct 112 is illustrated as comprising an aperture 304, aperture 306 and a bore 308. In particular, translucent outer tip 106 comprises aperture 304 terminating in application face 110. Opaque inner-tip 108 comprises aperture 306 terminating in abutment face 310. Abutment face 310 may comprise a substantially similar shape as application face 110. For example, abutment face 310 may comprise a concave surface formed in the conical body of multi-layered tip 102. Furthermore, the aperture 304 is configured to directly mate with aperture 306 during the manufacturing or assembly of multi-layered tip 102. As illustrated in FIG. 3, abutment face 310 may comprise substantially the same shape as application face 110 and provide support for application face 110. While aperture 306 terminates in abutment face 310, aperture 306 is further configured to comprise bore 308. FIG. 3 illustrates bore 308 extending longitudinally through opaque inner tip 108 and connector stem 312. The connector stem 312 is configured to retain the multi-layered tip 102 in/on the housing 104. The connector stem 312 may be secured to the housing 104 by, for example, a press-fit, snap-fit, adhesive, and/or engagement by one or more engagement features. In the illustrated implementation, the connector stem 312 is secured in the housing 104 by a series of ribs 314.

Furthermore, aperture 304 may terminate in application face 110 of translucent outer tip 106 in a verity of shapes and sizes. For example, aperture 304 may terminate in application face 110 as generally a circular, oval or diamond shape, or any other shape appropriate for delivering product to the application face 110. Similarly, aperture 306 may terminate in abutment face 310 as generally a circular, oval or diamond shape, or any other shape appropriate for mating with aperture 304 and application face 110. Finally, because translucent outer tip 106 may be injection over-molded about opaque inner tip 108 a substantially seamless interface is provided between translucent outer tip 106 and opaque inner tip 108. Likewise, aperture 304 terminating in application face 110 may comprise a substantially seamless interface with aperture 306 terminating in abutment face 310, thereby hindering seepage of product between the translucent outer tip 106 and opaque inner tip 108.

Figure 4:
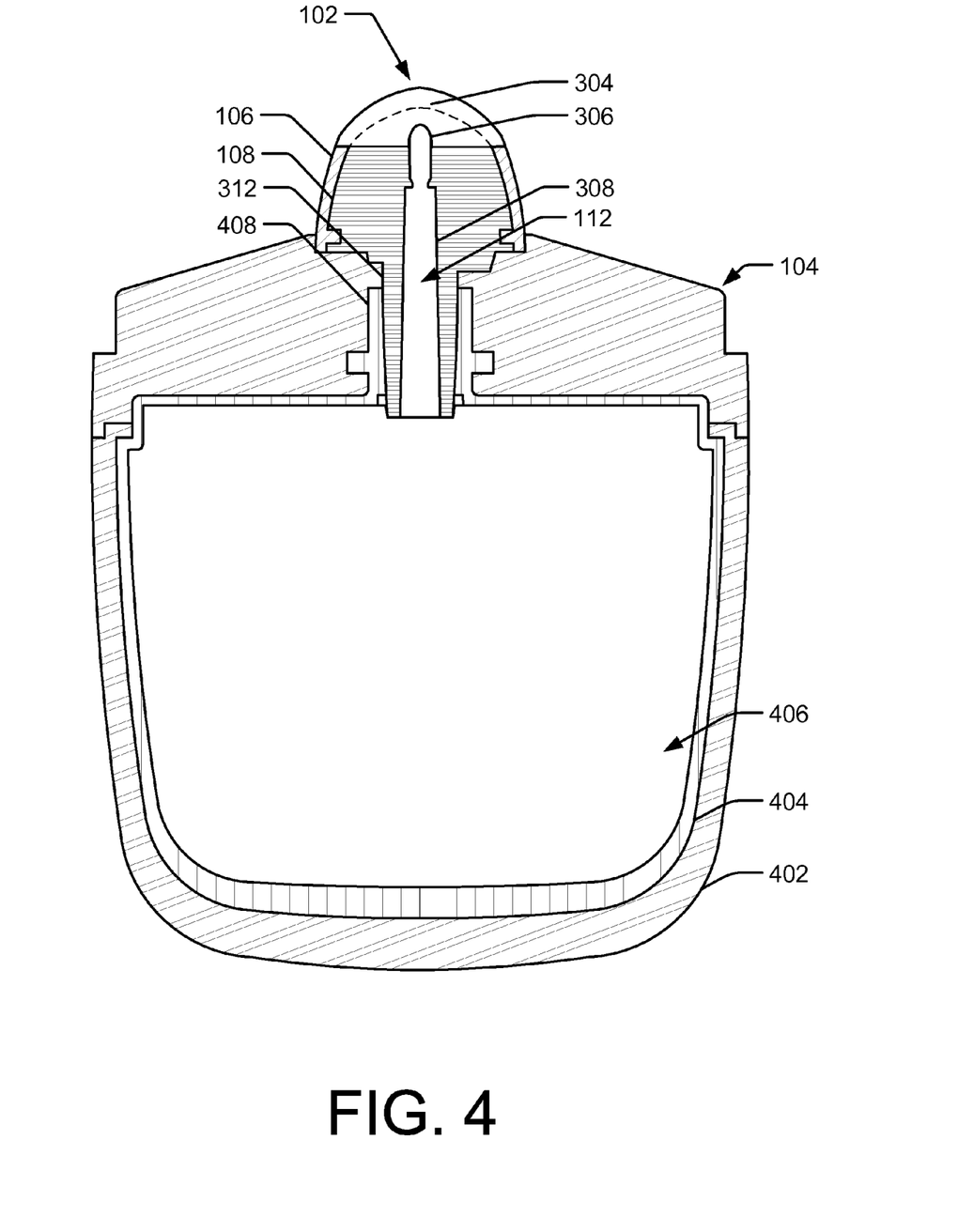
FIG. 4 illustrates cross-section B-B of a dispenser shown in FIG. 1, showing details of the interconnection of the housing and multi-layered tip, taken along line B-B of FIG. 2.

FIG. 4 illustrates a cross-section of dispenser 100 taken along line B-B illustrated in FIG. 2 and illustrates details of interconnection of housing 104 and multi-layered tip 102 of dispenser 100 shown in FIG. 1. In the illustrated implementation, the housing 104 comprises a shelled wall 402 configured to surround and hold a reservoir 404. In some embodiments, the reservoir 404 may comprise a substantially clear or translucent terpolymer. While FIG. 4 illustrates housing 104 surrounding and holding reservoir 404, in other embodiments the housing 104 itself my act as a reservoir. In that case, housing 104 may be formed of a flexible and translucent terpolymer. Here however, the shelled housing 104 provides exposure to a portion of reservoir 404, the exposed portion of reservoir 404 defining a flexible wall 406. The flexible wall 406 is configured to displace a portion of a product stored in the reservoir 404 into product delivery duct 112 and out aperture 304, which terminates in application face 110 of translucent outer tip 106.

As illustrated in FIG. 4, reservoir 404 is interconnected to application face 110 via product delivery duct 112 and, as described above, product delivery duct 112 comprises aperture 304, aperture 306 and bore 308. Bore 308 extends longitudinally through opaque inner tip 108 and connector stem 312. Here, connector stem 312 is received by reservoir coupling mechanism 408. With connector stem 312 securely coupled to reservoir coupling mechanism 408, product delivery duct 112 is able to transport product from the reservoir 404 through the product delivery duct 112 to the application face 110, when the exposed flexible wall 406 of reservoir 404 is displaced. However, as discussed above, housing 104 may itself be a clear and flexible reservoir formed of, for example, terpolymer, capable of being displaced and thereby dispensing product through the product delivery duct 112 to the application face 110.

Alternative Illustrative Dispensers

Figure 5:
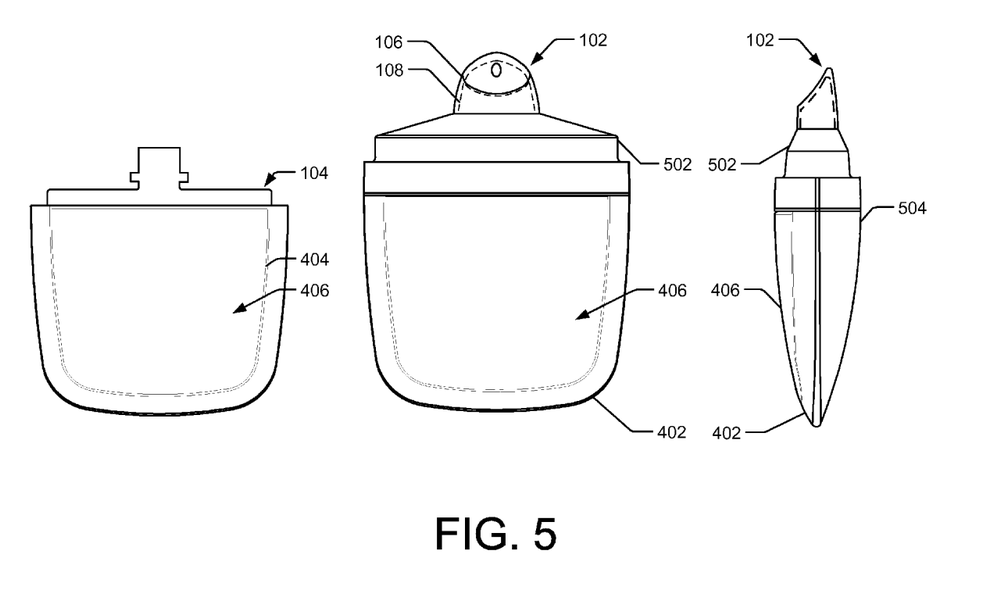
FIG. 5 illustrates a dispenser comprising a housing with a flexible wall and a multi-layered tip disposed thereon according to one illustrative implementation.
Figure 6:
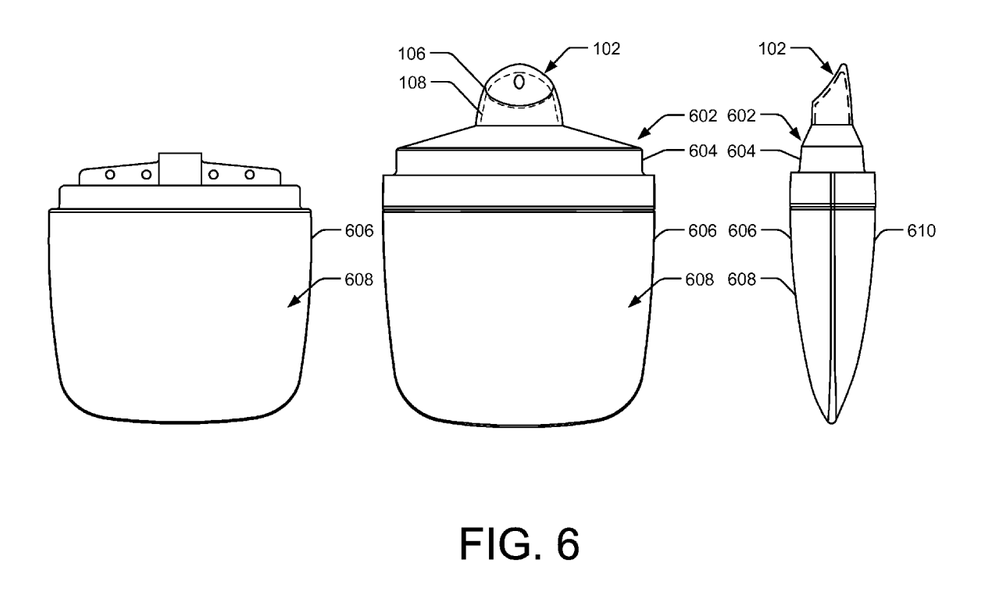
FIG. 6 illustrates a dispenser comprising a housing with two flexible walls according to another illustrative implementation, the housing having a similar multi-layered tip disposed thereon as the multi-layered tip illustrated in FIG. 5.
Figure 7:
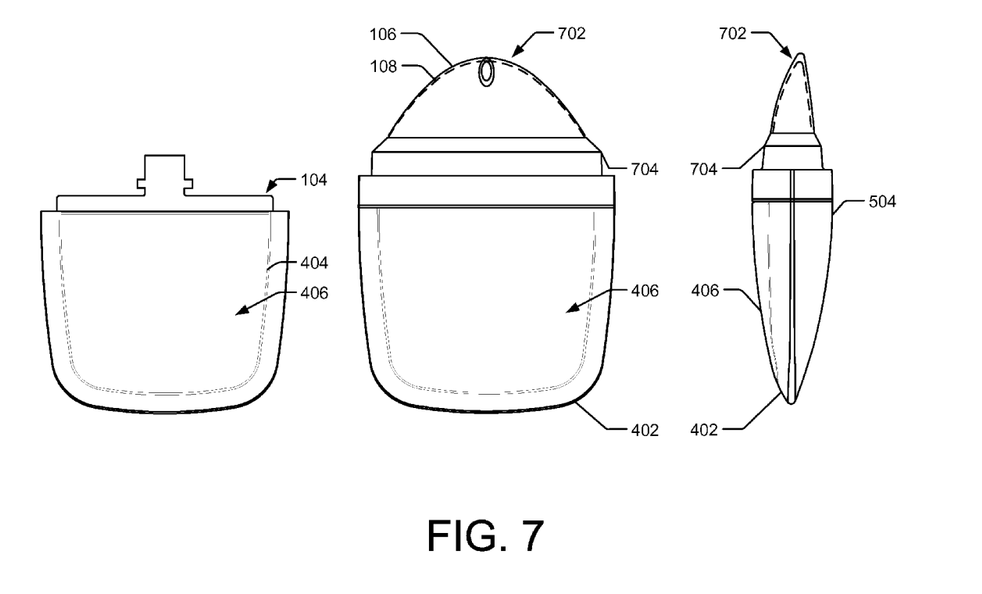
FIG. 7 illustrates a dispenser comprising the housing of FIG. 5 with a flexible wall and another illustrative implementation of a multi-layered tip disposed thereon.

FIG. 5, FIG. 6, and FIG. 7 illustrate alternative multi-layered tip dispensers. A front view of each embodiment is illustrated generally in the center portion of each of FIG. 5, FIG. 6, and FIG. 7. A respective side view of each embodiment is illustrated generally on the right portion of FIG. 5, FIG. 6, and FIG. 7. Also illustrated generally on the left portion of FIG. 5, FIG. 6, and FIG. 7 are respective housings.

Beginning with FIG. 5, the front view illustrated in FIG. 5 shows a multi-layered tip 102 as discussed above (i.e., a multi-layered tip 102 comprising translucent outer tip 106 molded about an opaque inner tip 108) coupled to a housing 104. Here, a collar 502 is illustrated to be disposed on top of housing 104 and about a portion of multi-layered tip 102. Collar 502 is configured to support multi-layered tip 102 that is interconnected to reservoir 404. As discussed above, housing 104 comprises a shelled wall 402, the shelled wall 402 exposing a flexible wall 406 of reservoir 404, the flexible wall 406 being configured to be displaced to reduce a volume of the reservoir 404. Additionally, in this implementation, the side view illustrated in FIG. 5 shows an inflexible wall 504 opposite the flexible wall 406. Here, flexible wall 406 may comprise a flexible and translucent terpolymer, while shelled wall 402 and inflexible wall 504 may comprise any suitable material for housing reservoir 404. For example shelled wall 402 and inflexible wall 504 may comprise plastic (e.g., terpolymer, polypropylene (PP), acrylonitrile butadiene styrene (ABS)), metal, glass, or any other suitable material. Additionally, although shelled wall 402 and inflexible wall 504 are illustrated in FIG. 5 as forming generally a pouch-shaped unit, (i.e., generally a longitudinally U-shaped front body and latitudinally oval shaped top body, the latitudinally oval shaped top body tapering to a single edge at the bottom of the longitudinally U-shaped body) other shapes are contemplated. For example, cross sections of shelled wall 404 and inflexible wall 504 may be generally disc shaped, rectangular, tubular, conical, or any other appropriate shape for housing reservoir 404 and exposing flexible wall 406.

Next, the front view of FIG. 6 illustrates mulit-layered tip 102, comprising translucent outer tip 106 molded about an opaque inner tip 108, coupled to housing 602. Here, housing 602 comprises collar 604 and reservoir 606. Similarly, as discussed above, collar 604 may support multi-layered tip 102 to reservoir 606. Reservoir 606 comprises a flexible wall 608 and another flexible wall 610 opposite the flexible wall 608. FIG. 6 side view illustrates flexible wall 608 opposite flexible wall 610 that form reservoir 606. In this implementation flexible wall 608 and flexible wall 610 may comprise a substantially clear/translucent terpolymer. However, flexible wall 608 may be translucent and flexible wall 610 may be opaque or tinted. Additionally, while both flexible walls 608 and 610 are described here as being formed of terpolymer, flexible walls 608 and 610 may be formed of any other suitable material that allows walls 608 and 610 to be displaced as well as be non-reactive or resistant to the product being dispensed. Again, here housing 602 is illustrated in FIG. 6 as being generally a pouch-shaped unit (i.e., generally a longitudinally U-shaped front body and latitudinally oval shaped top body, the latitudinally oval shaped top body tapering to a single edge at the bottom of the longitudinally U-shaped body). However, other shapes are contemplated. For example, housing 602 may be generally disc shaped, rectangular, tubular, conical, or any other shape appropriate for a reservoir.

FIG. 7 illustrates an additional embodiment of a multi-layered tip 702, comprising translucent outer tip 106 molded about an opaque inner tip 108, coupled to housing 104. As illustrated in front view and side view of FIG. 7, the multi-layered tip 702 is generally a tongue shaped body having a convex surface longitudinal to the housing. Also, and as discussed above, opaque inner tip 108 and translucent outer tip 106 are similar in shape to one another. Here, both opaque inner tip 108 and translucent outer tip 106 are also generally tongue shaped bodies having a convex surface longitudinal to the housing. A collar 704 may support multi-layered tip 702 to housing 104. As discussed above, housing 104 comprises a shelled wall 402 that exposes flexible wall 406. The flexible wall 406 of this embodiment is configured to be displaced and reduce a volume of the reservoir 404. Additionally, in the side view of FIG. 7, inflexible wall 504 is illustrated opposite the flexible wall 406. Here, again as discussed above, flexible wall 406 may comprise a flexible and translucent terpolymer, while shelled wall 402 and inflexible wall 504 may comprise any suitable material for housing reservoir 404. For example shelled wall 402 and inflexible wall 504 may comprise plastic (e.g., terpolymer, polypropylene (PP), acrylonitrile butadiene styrene (ABS)), metal, glass, or any other suitable material.

Furthermore, although shelled wall 402 and inflexible wall 504 are illustrated in FIG. 7, as forming generally a pouch-shaped unit, (i.e., generally a longitudinally U-shaped front body and latitudinally oval shaped top body, the latitudinally oval shaped top body tapering to a single edge at the bottom of the longitudinally U-shaped body) other shapes are contemplated. For example, shelled wall 404 and inflexible wall 504 may form generally disc, rectangular, tubular conical, or any other appropriate shape for housing reservoir 404 and exposing flexible wall 406.

Alternative Illustrative Multi-Layered Tips

Figure 8A:
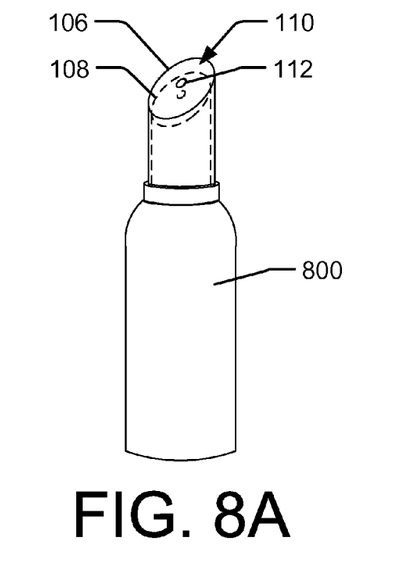
FIGS. 8A-8C show several alternative shaped multi-layer tips.
Figure 8B:
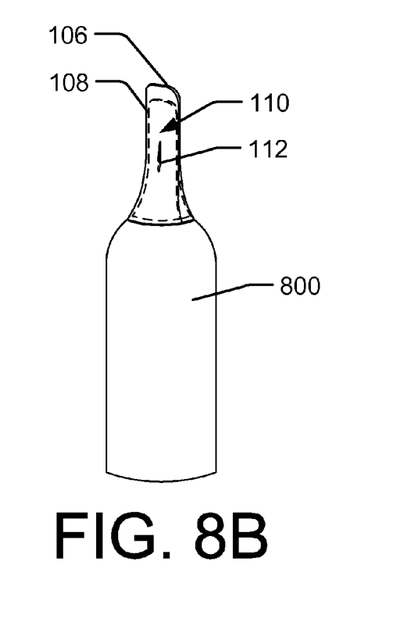
Figure 8C:
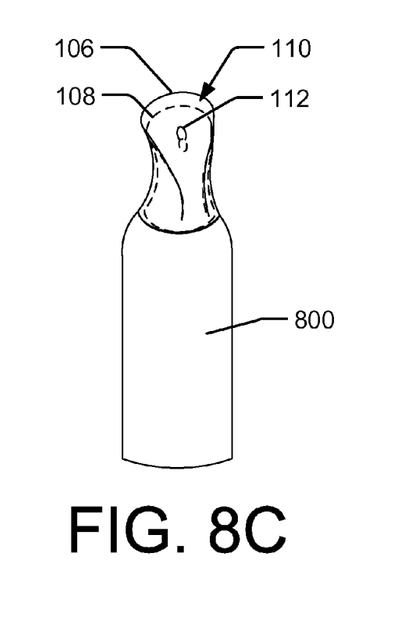

In the implementations shown in FIGS. 1-6, the multi-layered tip 102 is shown as having a generally conical body having a concave surface formed therein. In the implementation shown in FIG. 7 multi-layered tip 702 is shown as having a generally tongue like body having a convex surface longitudinal to the housing. However, in other implementations, multi-layered tip 102 may take any other desired forms, such as generally curvilinear shape, a generally cylindrical shape, or a generally planar shape or combinations of the foregoing, or the like. For example, FIG. 8A, FIG. 8B and FIG. 8C show several alternative shapes of multi-layer tip 102, disposed on generally cylindrical housings 800. Alternatively, any of the multi-layer tips 102 shown in these implementations (i.e., FIGS. 8A-8C) may be fixed to a housing (e.g., housing 104) comprising a flexible wall 406, or a housing (e.g., housing 602) comprising a flexible wall 608 opposite another flexible wall 610. Furthermore, any of the multi-layer tips 102 shown in these implementations may be fixed to any other suitable housing. For example, any of the multi-layer tips 102 shown in these implementations may be fixed to a pentype housing, a tube-type housing, or bottle-type housing.

Each illustrated shape, of multi-layered tip 102, shown in FIGS. 8A-8C comprise a translucent outer tip 106 molded about an opaque inner tip 108 that is coupled to a housing (e.g., 104 or 602). Likewise, as discussed above, translucent outer tip 106 may comprise acrylic and opaque inner tip 108 may comprise polypropylene (PP) or acrylonitrile butadiene styrene (ABS). Additionally, and as discussed above, the opaque inner tip 108 of multi-layered tip 102 may be the same color as the color of a product contained in a housing the multi-layered tip 102 is disposed on. Furthermore, the multi-layer tips 102 illustrated in FIGS. 8A-8C may be coupled to the respective housings 104 or 602 in a similar fashion as discussed above. That is, opaque inner tip 108 may comprise a connector stem 312 being configured to retain the multi-layered tip 102 in the housing 104 or 602 by way of a series of ribs 314. While a series of ribs 314 may substantially fix multi-layered tip 102 to any of housings 104 or 602, other retaining mechanisms are contemplated. For example, crimping, adhesive, press-fit, snap-fit, or barbs on the inside of the housings 104 or 602 and/or the outside of the connector stem 312 of the opaque inner tip 108, and/or by any other suitable attachment means. Finally, each of the illustrated multi-layered tips 102 may also comprise a product delivery duct 112, described above, to provide interconnection of an application face 110 of the translucent outer tip 106 and a reservoir (e.g., 404 or 606) of any of the housings 104 or 602.

Example Process for Manufacturing a Multi-Layered Tip

Figure 9:
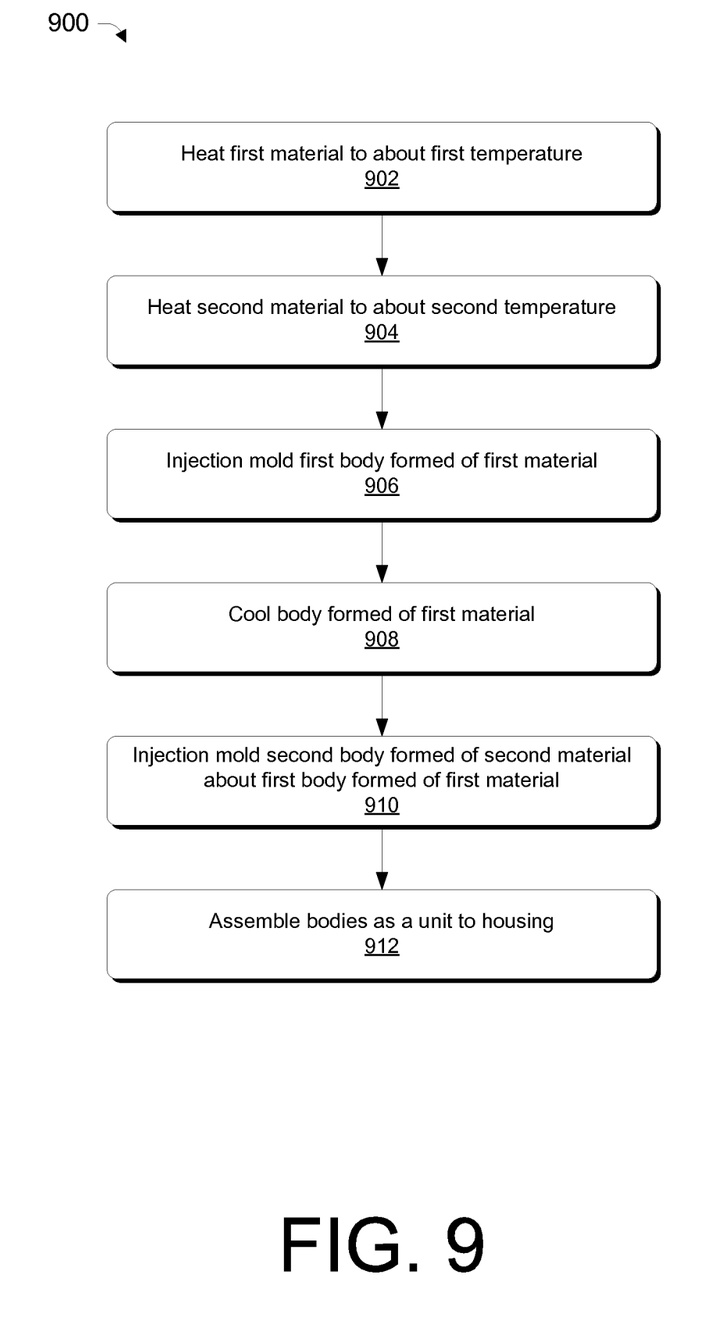
FIG. 9 illustrates an example process 900 for manufacturing a multi-layer tip.

FIG. 9 illustrates an example process 900 for manufacturing a multi-layer tip 102 based at least in part on material characteristics of the particular multi-layered tip 102. For instance, this process may be performed to manufacture a multi-layered tip 102 comprising a translucent outer tip 106 formed of acrylic and an opaque inner tip 108 formed of polypropylene (PP) or acrylonitrile butadiene styrene (ABS). In some instances, the process may be performed at a manufacturing facility and prior to the assembly of the dispenser 100. While FIG. 9 illustrates a process for manufacturing a multi-layered tip 102 configured to apply product to a surface, this process may apply to the manufacturing of any type of applicator tip. Additionally, this process may apply to manufacturing any type of applicator tip formed of any other suitable materials capable of being injection over-molded.

Process 900 includes an operation 902, which represents heating a first material (e.g., polypropylene (PP) or acrylonitrile butadiene styrene (ABS)) to a first molding temperature of about 240 degrees Celsius. Next, process 900 proceeds to operation 904, which represents heating a second material (e.g., acrylic) to a second molding temperature of about 220 degrees Celsius. In some instances, both of the materials may be heated simultaneously to respective first and second molding temperatures. Process 900 continues to operation 906, where subsequent to at least the heating of the first material, a first body (e.g., an inner tip) is formed of the first material via an injection molding process. Operation 906 is followed by operation 908 where the first body formed of the first material is cooled to about room temperature. Following operation 908, at operation 910, and subsequent to the cooling of the first body formed of the first material, a second body (e.g., an outer tip) is formed, and in this instance is formed of the second material. Here, however, the injection molding process involves injection over-molding the second material at the second molding temperature about the first body formed of the first material. In some instances, the first body formed of the first material is opaque and the second body formed of the second material is translucent. In some implementations, the second molding temperature may be about the same as the first molding temperature, in which case the second material fuses with the first material. After operation 910, process 900 continues with operation 912, where the first body and the second body are cooled to about room temperature and subsequent to the cooling of the bodies (e.g., a multi-layered tip 102) may be assembled as a unit to a housing (e.g., either of housings 104 or 602).

Conclusion

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having a translucent outer tip formed of a translucent plastic material and an opaque inner tip formed of an opaque plastic material, other materials are also contemplated. For example, translucent outer tip may be formed of glass. Additionally, for example, the opaque inner tip may comprise various opaque plastics, metals, ceramics, woods, composites, and the like. In one specific example, a translucent outer tip formed of glass may be press fit around an opaque inner tip to form multi-layer tip. Alternatively, in the case where the opaque inner tip is made of plastic, the opaque inner tip may be molded inside the translucent glass outer tip with the glass outer tip essentially forming the mold for the opaque inner tip.

What is claimed is:

1. A dispenser comprising:
a housing comprising a reservoir for containing a product;
an opaque inner tip coupled to the housing;
a clear outer tip molded about the opaque inner tip, the clear outer tip having an application face for applying the product to a surface; and
a product delivery duct interconnecting the reservoir and the application face.

2. The dispenser of claim 1, wherein the clear outer tip is made of a material different than a material of the opaque inner tip.

3. The dispenser of claim 1, wherein the clear outer tip is over-molded on the opaque inner tip.

4. The dispenser of claim 3, wherein the opaque inner tip comprises polypropylene (PP) or acrylonitrile butadiene styrene (ABS).

5. The dispenser of claim 3, wherein the clear outer tip comprises acrylic.

6. The dispenser of claim 1, further comprising a cap removably disposed on the housing encapsulating the clear outer tip for stopping the product delivery duct.

7. The dispenser of claim 1, wherein the application face comprises a generally curvilinear shape, a generally cylindrical shape, or a generally planar shape.

8. The dispenser of claim 1, wherein the housing is generally pouch-shaped and comprises a flexible wall for forcing the product from the reservoir.

9. The dispenser of claim 8, wherein the flexible wall comprises terpolymer.

10. The dispenser of claim 8, wherein the generally pouch-shaped housing comprises another flexible wall opposite the flexible wall.

11. The dispenser of claim 8, wherein the generally pouch-shaped housing comprises an inflexible wall opposite the flexible wall.

12. The dispenser of claim 11, wherein the inflexible wall comprises terpolymer.

13. The dispenser of claim 8, wherein the flexible wall is substantially clear.

14. The dispenser of claim 8, further comprising a cap, the cap being substantially the same shape as the generally pouch-shaped housing.

15. The dispenser of claim 1, further comprising a product contained in the reservoir of the housing wherein the opaque inner tip is substantially a same color as a color of the product contained in the reservoir.

16. The dispenser of claim 1, wherein the clear outer tip is substantially colorless.

17. The dispenser of claim 1, wherein the clear outer tip is tinted.

18. The dispenser of claim 1, wherein the clear outer tip comprises a substantially more supple material than a material of the opaque inner tip.

19. The dispenser of claim 1, wherein the housing comprises a substantially clear wall for viewing the product.

20. The dispenser of claim 1, wherein the clear outer tip comprises a substantially more smooth material than a material of the opaque inner tip.

21. A dispenser comprising:
- a housing comprising a reservoir for containing a product;
- a multi-layered tip securely disposed to the housing, the multi-layered tip comprising a translucent outer tip disposed about an opaque inner tip, the outer tip having an application face for applying the product to a surface; and
- a product delivery duct interconnecting the reservoir and the application face.

22. The dispenser of claim 21, wherein the opaque inner tip comprises polypropylene (PP) or acrylonitrile butadiene styrene (ABS).

23. The dispenser of claim 21, wherein the translucent outer tip comprises acrylic.

24. The dispenser of claim 21, wherein the clear outer tip is coupled to the opaque inner tip by over-molding.

\* \* \* \* \*